Sept. 6, 1966   O. K. NILSSEN   3,271,766
CONTINUOUS WAVE FM RADAR
Filed May 4, 1964   2 Sheets-Sheet 1

OLE K. NILSSEN
INVENTOR

BY John R. Faulkner
Keith L. Zerschling
ATTORNEYS

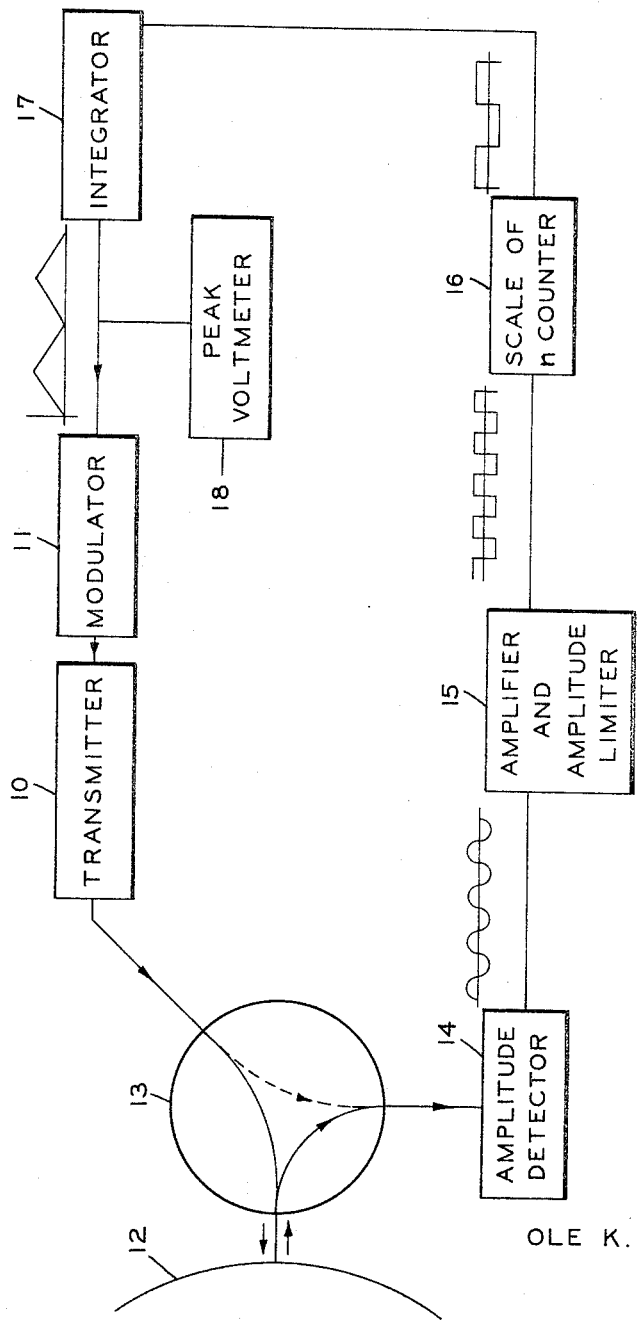

3,271,766
CONTINUOUS WAVE FM RADAR
Ole K. Nilssen, Livonia, Mich., assignor to Ford Motor Company, Dearborn, Mich., a corporation of Delaware
Filed May 4, 1964, Ser. No. 364,515
9 Claims. (Cl. 343—14)

This invention relates to a continuous wave radar system and more particularly to a continuous wave radar system of the frequency modulated type that has reduced transmission bandwidth requirements and no fixed range error.

A well known drawback of standard frequency modulated radar is that a fixed error is caused by the digital or quantized nature of the range reading. As a result of this quantization of the range reading, it is necessary to use a very wide transmission bandwidth in order to achieve accurate range readings, particularly at short ranges.

In standard frequency modulated radar, the frequency of the transmitted signal is varied by a certain amount. Range is obtained by counting how many beat cycles occur as a result of the mixing of the transmitted and reflected signals. As may be readily understood, there will be an inaccuracy in range reading possible corresponding to one beat cycle count. Thus, in order to achieve a sufficiently accurate range measure, a certain minimum number of beat cycles must be produced. This implies a certain minimum frequency swing by the transmitter which for close ranges or high accuracies may become exceedingly large. This in turn requires large transmission bandwidths, with resulting complex and expensive electronic equipment.

The present invention provides a continuous wave radar system in which there is no fixed error, and as a result the system operates with a much reduced transmission bandwidth requirement. This simplifies the electronic equipment required, and provides a very accurate system particularly for measurement of short ranges.

In the invention, the frequency swing of the transmitter required for a given count of beat cycles is determined, rather than determining the number of beat cycles that occur for a given frequency swing as is done in conventional frequency modulated radar. As a result of this, there is no fixed error involved in that the frequency swing of the transmitter can be measured simply and directly in a proportional or nonquantized manner. From this information, range may be computed directly.

In accordance with the invention, a frequency modulated transmitting means is employed for transmitting a signal to the target. Means are provided for receiving and combining the signal transmitted and a signal reflected from the target. This signal is applied to a means that produces a beat signal having a frequency representative of the difference between the transmitted and the received signal. Means are connected to this last mentioned means for determining the frequency change in the transmitting means for a given number of beat cycles. This may be done by a feedback system that reverses the rate of change of frequency of the transmitting means each time a predetermined number of beat cycles is produced. Range may be easily computed by measuring a variable from which the change in frequency between these reversals can be determined.

An object of the present invention is the provision of a continuous wave radar system that has a small transmission bandwidth.

Another object of the present invention is the provision of a continuous wave radar of the frequency modulated type in which no fixed error of range measurement is produced.

A further object of the invention is the provision of a continuous wave radar system of the frequency modulated type that is capable of accurately measuring very small ranges and employs a minimum of transmission bandwidth for accomplishing this purpose.

Other objects and attendant advantages of the present invention may be more fully realized when the specification is considered in connection with the attached drawing in which:

FIGURE 2 is a block diagram of one embodiment of the invention.

Figure 1:
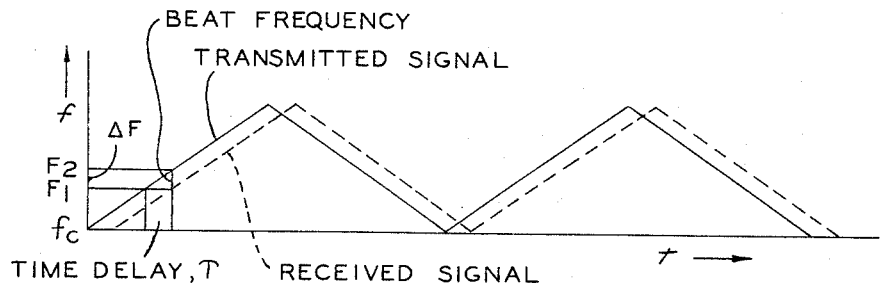
FIGURE 1 is a waveform of the transmitted and received signals in a frequency modulated radar system showing the frequency swing of the carrier signal.

In a conventional frequency modulated radar system, the carrier frequency may be modulated by a modulated voltage such that the frequency of the transmitted signal versus time appears in accordance with the solid line waveform shown in FIGURE 1. The dotted line waveform represents the reflected signal from the target delayed in time. This time delay can be used, as is well known to those skilled in the art, to determine distance or range to the target.

In order to determine range in accordance with the above principles, the frequency difference between the transmitted and the received signal is determined. This is ordinarily done by mixing or beating these two signals together and then amplitude detecting the combined signal. The frequency of this difference or beat signal provides a direct measure of range to the target. In such a case, range may be expressed as $$R = \frac{nc}{2 df/dt \, T}$$

In this equation $n$ is a number determined by applying the beat frequency mentioned above to a counter, $c$ is the speed of light, $df/dt$ is the time rate of change of the transmitter frequency, or the slope of the transmitted signal depicted in FIGURE 1, and $T$ is the time allowed for counting.

Since $n$, the output from the counter, must be in the form of a whole number, there exists a possiiblity of error corresponding to one count. For very short ranges, this uncertainty may correspond to a great percentage error in the range. In order to obviate this difficulty in conventional radar systems, the frequency of the transmitter must be deviated very rapidly in order to achieve a sufficiently large number of counts for short ranges. This implies a very large transmission bandwidth and expensive electronic equipment.

The present invention provides a frequency modulated radar system that has no fixed range error and that has small transmission bandwidth requirements. This is achieved by employing means for measuring the frequency swing required for a given count of beat cycles, rather than counting the number of beat cycles associated with a given frequency swing.

Referring back to FIGURE 1, it can be appreciated that a given change in transmitter frequency is equal to the time delay $\tau$ between the transmitted and received signals multiplied by the slope of the curves or plots shown in FIGURE 1, or in other words, $$\Delta F = df/dt \cdot \tau$$

Rearranging this equation and integrating gives $$\int \Delta F \, dt = \tau \int_{F_1}^{F_2} df$$

The left-hand side of this equation is equal to the number of beat cycles or $n$ for a given time interval, while the right-hand side gives $$\tau(F_2-F_1)$$

Therefore, $$n=\tau(F_2-F_1)$$

Substituting this into the range equation $$2R=\tau\cdot c$$

gives $$R=\frac{n\cdot c}{2(F_2-F_1)}$$

As a result, if $n$ is kept constant, range may be easily determined by measuring the frequency swing of the transmitter involved in bringing about a fixed number of beat cycles. FIGURE 2 of the drawing discloses a block diagram of one embodiment of the invention for accomplishing this purpose.

In FIGURE 2, a transmitter 10 that may be operated in the microwave region is frequency modulated by a modulator 11. The energy from the transmitter 10 is applied to an antenna 12 through a circulator 13, and is transmitted to a target to determine its range with respect to the system. The echo or received signal from the target is received by the same antenna 12 and is then fed to an amplitude detector 14 through the circulator 13. A portion of the transmitted signal from the transmitter 10 leaks through the circulator 13, as shown by the dotted lines, to the amplitude detector 14. The transmitted signal from the transmitter 10 and the echo signal or received signal from the target are thus mixed and the amplitude detector 14 produces a beat signal which has a frequency equal to the difference between the transmitted signal and the echo or received signal.

The beat signal produced by the amplitude detector 14 may then be fed to an amplifier and an amplitude limiter 15 that produces a rectangular wave, as shown, from the essentially sinusoidal beat frequency signal. This rectangular wave is then applied to a scale of $n$ counter 16 which may be set to change its output after having accepted a certain count $n$. For example, it may be set to count 2, 3, 4 or 5 beat cycles or any other number that is appropriate and convenient. In the example shown with the waveforms in FIGURE 2, $n$ has been selected as the whole number 1. As shown, the scale of $n$ counter 16 will produce an output voltage having either of two constant voltage levels and it switches from one of these levels to the other after having accepted the count $n$.

The rectangular waveform from the scale of $n$ counter 16 is then fed to an integrator 17 that integrates the output voltage waveform from the scale of $n$ counter thereby producing the triangular waveform shown. This triangular waveform is applied to the modulator 11 which will produce a frequency change in the transmitted signal from the transmitter 10 proportional to this voltage. It can readily be appreciated that the frequency change in the transmitter 10 will follow the triangular waveform shown in FIGURE 1. In order to determine range it is only necessary to determine the frequency difference in the transmitted signal corresponding to a given number of beat cycles. This may be done by measuring the peak voltage output of the integrator 17 since it is directly proportional to the frequency difference in the transmitted signal associated with a given number of beat cycles. In order to measure this voltage, it is only necessary that a peak reading voltmeter 18 be connected to read the peak voltage outputs of the integrator 17. It may be seen that range may be easily determined from the previously developed equation $$R=\frac{n\cdot c}{2(F_2-F_1)}$$

since $n$ and $c$ are constants.

Figure 3:
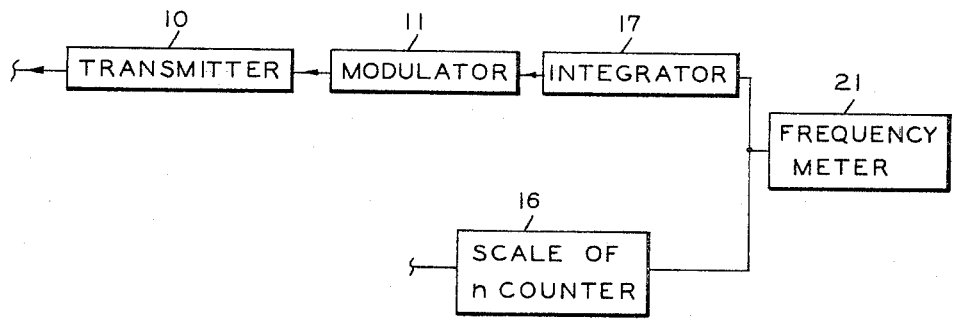
FIGURE 3 is a partial block diagram of another embodiment of the invention.

Another way of determining range from the invention disclosed in FIGURE 2 is to connect a frequency meter 21 to the scale of $n$ counter 16 as shown in the partial block diagram of FIGURE 3. It should be understood that the remainder of the invention, not shown in FIGURE 3, is the same as that shown in FIGURE 2. Since the waveform produced by the integrator 17 has a constant slope, it is apparent that the time intervals between the reversal of slope will provide an indication of range, and this time may be easily found through computation by using the frequency at which this occurs. This frequency may be measured by the use of the frequency meter 21 connected to the scale of $n$ counter, since the waveform output from the integrator 17 reverses twice during each cycle of the output voltage from the scale of $n$ counter.

Figure 4:
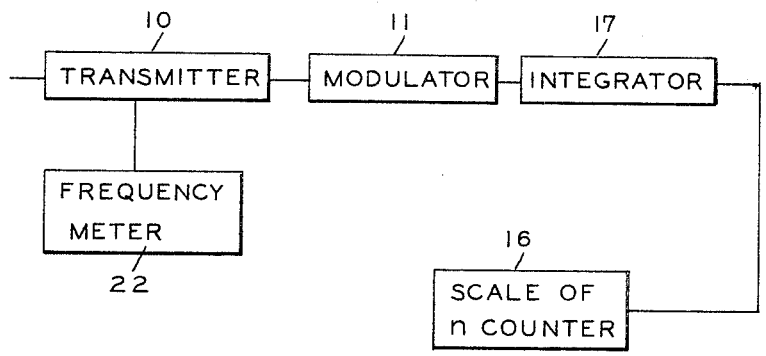
FIGURE 4 is a partial block diagram of still another embodiment of the invention.

The frequency change of the transmitted signal associated with the given count of beat cycles may also be measured directly from the modulator or transmitter by use of a frequency meter 22 that may be connected to the transmitter 10 as shown in FIGURE 4. This frequency difference, is the difference in frequency between reversals of the rate of change of frequency as represented by the triangular waveform shown in FIGURE 1 and the triangular waveform that is produced by the integrator 17.

Another way to measure range would be to measure the time involved for the scale of $n$ counter 16 to flip from one position to the other. As brought out previously in the discussion of the measurement of the frequency difference between the reversals of the rate of change of frequency by use of the frequency meter 21, this time it may be used directly to compute the frequency difference and hence be used to compute range to the target.

The present invention thus provides a continuous wave radar system of the frequency modulated type that operates with no fixed range error and which may be used to determine short ranges accurately with a minimum bandwidth.

It is to be understood that this invention is not to be limited to the exact construction shown and described but that various changes and modifications may be made without departing from the spirit and scope of the invention as defined in the appended claims.

I claim:

1. A continuous wave radar system for determining range between the system and a target comprising, a transmitting means, modulating means coupled to said transmitting means for frequency modulating said transmitting means, means for receiving and combining a signal transmitted by said transmitting means and a signal reflected from the target, means coupled to said last mentioned means for producing a beat frequency signal that varies as a function of the range between the system and the target and having a frequency equal to the difference between the transmitted signal and the received signal, and means coupled to said last mentioned means and said modulating means for modifying the rate of change of said transmitting means each time a given number of beat cycles is produced, and means connected in circuit with said last mentioned means and said modulating means for determining the frequency swing of said transmitting means required for said given number of said beat cycles whereby range between the system and the target may be determined.

2. A continuous wave radar system for measuring range between the system and a target comprising, a transmitting means, modulating means connected to said transmitting means for frequency modulating said transmitting means, means for receiving and combining a signal transmitted by said transmitting means and a signal reflected from the target, means coupled to said last mentioned means for producing a signal having a frequency equal to the difference between the transmitted signal and the received signal, means coupled to said last mentioned means and said modulating means for reversing the rate of change of frequency of said transmitting means each time a predetermined number of beat cycles is produced.

3. A continuous wave radar system for measuring range between the system and a target comprising, a transmitting means, modulating means connected to said transmitting means for frequency modulating said transmitting means, means for receiving and combining a signal transmitted by said transmitting means and a signal reflected from the target, means coupled to said last mentioned means for producing a signal having a frequency equal to the difference between the transmitted signal and the received signal, means coupled to said last mentioned means and said modulating means for reversing the rate of change of frequency of said transmitting means each time a predetermined number of beat cycles is produced, and means coupled to said last mentioned means for measuring a variable from which range may be determined.

4. A continuous wave radar system for measuring range between the system and a target comprising, a transmitting means, modulating means coupled to said transmitting means for frequency modulating said transmitting means, means for receiving and combining a signal transmitted by said transmitting means and a signal reflected from said target, detecting means connected to said last mentioned means for producing a beat signal having a frequency equal to the frequency difference between the signal transmitted by said transmitting means and the signal reflected from said target, means connected to said detecting means and said modulating means for reversing the rate of change of frequency of said transmitting means each time a given number of beat cycles is produced by said detecting means, and means connected in circuit with said means connected to detecting means and modulating means for determining the frequency swing of said transmitting means required for said given number of beat cycles whereby range between the system and the target may be determined.

5. A continuous wave radar system for measuring range between the system and a target comprising, a transmitting means, modulating means connected to said transmitting means for frequency modulating said transmitting means, means for receiving and combining a signal transmitted by said transmitting means and a signal reflected from the target, detecting means connected to said last mentioned means for producing an output signal having a frequency equal to the difference between the transmitted and said received signals, counter means connected to said detector means for counting the number of output signal cycles from said detecting means and for producing a rectangular wave output signal having a frequency equal to the frequency of the output signal from said detecting means divided by a predetermined whole integer, an integrator coupled to said counter means for producing a triangle waveform from said rectangular wave output signal from said counter means, said integrator coupled to said modulating means for applying said triangular waveform to said modulating means whereby the change of frequency of the signal transmitted by said transmitter follows said triangular waveform, and means coupled to said system for measuring a variable from which the frequency difference of said transmitter means between changes in slope of said triangular waveform may be determined whereby range from the system to the target may be computed.

6. The combination of claim 5 in which said last mentioned means is a frequency meter coupled to said counter means.

7. The combination of claim 5 in which said last mentioned means is a peak voltmeter connected to the output of said integrator.

8. The combination of claim 5 in which said last mentioned means is a frequency meter coupled in circuit with said transmitting means for measuring the frequency difference of said transmitter means between reversals of slope of said triangular waveform.

9. A continuous wave radar system for measuring range between the system and a target comprising, a transmitting means, modulating means coupled to said transmitting means for frequency modulating said transmitting means, means for receiving and combining a signal transmitted by said transmitting means and a signal reflected from said target, detecting means connected to said last mentioned means for producing a beat signal having a frequency equal to the frequency difference between the signal transmitted by said transmitting means and the signal reflected from said traget, means connected to said detecting means and said modulating means for modifying the rate of change of frequency of said transmitting means each time a given number of beat cycles is produced by said detecting means, and means connected in circuit with said means connected to detecting means and modulating means for determining the frequency swing of said transmitting means required for said given number of beat cycles whereby range between the system and the target may be determined.

References Cited by the Examiner
UNITED STATES PATENTS
2,543,782   3/1951   Kiebert _____ 343—14
FOREIGN PATENTS
525,123   5/1956   Canada.

CHESTER L. JUSTUS, *Primary Examiner.*
R. E. KLEIN, P. M. HINDERSTEIN,
*Assistant Examiners.*